(12) United States Patent
O et al.

(10) Patent No.: US 11,378,772 B2
(45) Date of Patent: *Jul. 5, 2022

(54) DUAL CAMERA MODULE AND OPTICAL DEVICE

(71) Applicant: LG INNOTEK CO., LTD., Seoul (KR)

(72) Inventors: Young Don O, Seoul (KR); Sang Yeon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,804

(22) Filed: Jul. 21, 2020

(65) Prior Publication Data
US 2020/0348487 A1 Nov. 5, 2020

Related U.S. Application Data

(63) Continuation of application No. 15/740,711, filed as application No. PCT/KR2016/006762 on Jun. 24, 2016, now Pat. No. 10,761,292.

(51) Int. Cl.
*G02B 7/09* (2021.01)
*G03B 17/02* (2021.01)
(Continued)

(52) U.S. Cl.
CPC .............. *G02B 7/09* (2013.01); *G03B 17/00* (2013.01); *G03B 17/02* (2013.01); *G03B 19/22* (2013.01);
(Continued)

(58) Field of Classification Search
CPC .......... G02B 7/09; G03B 17/02; G03B 17/00; G03B 19/22; H04N 5/2252; H04N 5/2253; H04N 5/2258
See application file for complete search history.

(56) References Cited

U.S. PATENT DOCUMENTS

| 5,219,292 A | 6/1993 | Dickirson et al. |
| 6,407,457 B1 | 6/2002 | Aschenbrenner et al. |
| (Continued) |

FOREIGN PATENT DOCUMENTS

| CN | 1844966 A | 10/2006 |
| CN | 102667619 A | 9/2012 |
| (Continued) |

OTHER PUBLICATIONS

Office Action dated Jun. 24, 2020 in Chinese Application No. 201680038022.4.
(Continued)

*Primary Examiner* — Luong T Nguyen
(74) *Attorney, Agent, or Firm* — Saliwanchik, Lloyd & Eisenschenk

(57) ABSTRACT

The present embodiments relate to a dual camera module comprising: a first camera module including a first lens module and a first image sensor disposed below the first lens module; and a second camera module including a second lens module and a second image sensor disposed below the second lens module, wherein the second camera module has a wider angle of view than the first camera module, and the second image sensor is disposed at a position higher than the first image sensor.

20 Claims, 6 Drawing Sheets

(51) Int. Cl.
*G03B 17/00* (2021.01)
*G03B 19/22* (2021.01)
*H04N 5/225* (2006.01)

(52) U.S. Cl.
CPC ......... *H04N 5/2252* (2013.01); *H04N 5/2253* (2013.01); *H04N 5/2258* (2013.01)

(56) References Cited

U.S. PATENT DOCUMENTS

| | | | |
|---|---|---|---|
| 7,405,764 | B2 | 7/2008 | Gustavsson et al. |
| 7,423,689 | B2 | 9/2008 | Kim et al. |
| 7,471,428 | B2 | 12/2008 | Ohara et al. |
| 7,576,430 | B2 | 8/2009 | Chang et al. |
| 7,619,683 | B2 * | 11/2009 | Davis .................. H04N 5/2257 348/374 |
| 7,920,206 | B2 | 4/2011 | Moon et al. |
| 7,961,234 | B2 * | 6/2011 | Viinikanoja ......... H04N 13/239 348/264 |
| 8,786,769 | B2 | 7/2014 | Grandin et al. |
| 9,241,097 | B1 | 1/2016 | Tam |
| 9,413,972 | B2 | 8/2016 | Shabtay et al. |
| 10,761,292 | B2 * | 9/2020 | O .............................. G02B 7/09 |
| 2005/0046740 | A1 | 3/2005 | Davis |
| 2005/0213170 | A1 | 9/2005 | Ohara et al. |
| 2008/0030592 | A1 | 2/2008 | Border et al. |
| 2010/0044814 | A1 * | 2/2010 | Lin ......................... H01L 24/97 257/432 |
| 2010/0328471 | A1 | 12/2010 | Boland et al. |
| 2011/0122300 | A1 | 5/2011 | Gruber et al. |
| 2013/0242183 | A1 | 9/2013 | Lee |
| 2014/0092265 | A1 | 4/2014 | Hsu et al. |
| 2015/0130974 | A1 | 5/2015 | Chuang et al. |
| 2016/0295097 | A1 | 10/2016 | Shanmugavadivelu et al. |

FOREIGN PATENT DOCUMENTS

| | | |
|---|---|---|
| CN | 103222257 A | 7/2013 |
| CN | 103338622 A | 10/2013 |
| CN | 204305162 U | 4/2015 |
| JP | 2004-048287 A | 2/2004 |
| JP | 2007-306282 A | 11/2007 |
| JP | 2010-524279 A | 7/2010 |
| JP | 2014-187576 A | 10/2014 |
| KR | 10-2005-0084887 A | 8/2005 |
| KR | 10-0575639 B1 | 5/2006 |
| KR | 10-0867524 B1 | 11/2008 |
| KR | 10-0932175 B1 | 12/2009 |
| KR | 10-2010-0099932 A | 9/2010 |
| KR | 10-2011-0045549 A | 5/2011 |
| KR | 10-2011-0111624 A | 10/2011 |
| KR | 10-2012-0011618 A | 2/2012 |
| KR | 10-2013-0061322 A | 6/2013 |
| WO | WO-2014/199338 A2 | 12/2014 |

OTHER PUBLICATIONS

International Search Report dated Jun. 24, 2016 in International Application No. PCT/KR2016/006762.
Office Action dated Nov. 25, 2019 in Chinese Application No. 201680038022.4.
Office Action dated Sep. 7, 2018 in U.S. Appl. No. 15/740,711.
Office Action dated Jan. 11, 2019 in U.S. Appl. No. 15/740,711.
Office Action dated Mar. 21, 2019 in U.S. Appl. No. 15/740,711.
Office Action dated Sep. 26, 2019 in U.S. Appl. No. 15/740,711.
Office Action dated Jan. 9, 2020 in U.S. Appl. No. 15/740,711.
Notice of Allowance dated Apr. 22, 2020 in U.S. Appl. No. 15/740,711.
Office Action dated Jun. 16, 2021 in Korean Application No. 10-2015-0092364.
Office Action dated Jul. 5, 2021 in Korean Application No. 10-2015-0092587.
Office Action dated Jul. 15, 2021 in Korean Application No. 10-2015-0112497.

* cited by examiner (a)

(b)

DUAL CAMERA MODULE AND OPTICAL DEVICE

CROSS-REFERENCE TO RELATED APPLICATIONS

This application is a continuation of U.S. patent application Ser. No. 15/740,711, filed Dec. 28, 2017, which is the U.S. national stage application of International Patent Application No. PCT/KR2016/006762, filed Jun. 24, 2016, which claims priority to Korean Patent Application Nos. 10-2015-0092364, filed Jun. 29, 2015; 10-2015-0092587, filed Jun. 30, 2015; and 10-2015-0112497, filed Aug. 10, 2015, the disclosures of each of which are incorporated herein by reference in their entirety.

TECHNICAL FIELD

The teachings in accordance with exemplary and non-limiting embodiments of this invention relate generally to a dual camera module and an optical apparatus.

BACKGROUND ART

Concomitant with widely generalized dissemination of various mobile terminals and commercialization of wireless Internet services, demands by consumers related to mobile terminals are diversified to prompt various types of peripheral devices or additional equipment to be mounted on mobile terminals. Inter alia, camera modules may be representative items photographing an object in a still picture or a video. Recently, a dual camera module has been developed, as one type of camera module, to obtain a high quality of photographs or images through a digital zoom relative to an object at a proximate distance and at a long distance as well.

However, the dual camera module suffers from a disadvantage in that an inner structure of a wide angle camera module is exposed through a broad window required to obtain a view angle of the wide angle camera module, thereby causing a damage in terms of design aspect. Furthermore, the conventional dual camera module was formed with a large PCB (Printed Circuit Board) in order to respectively provide an electrical conductive structure for connecting optical elements such as a camera module, a power source, and a controller, the configuration of which problematically results in increased total length of the dual camera module.

DETAILED DESCRIPTION OF THE INVENTION

Technical Subject

In order to solve the abovementioned problems/disadvantages, exemplary embodiments of the present invention provide a dual camera module minimized in inner structure exposure of a wider angle camera module. Furthermore, exemplary embodiments of the present invention provide a dual camera module minimized in total length of the dual camera module. Still furthermore, exemplary embodiments of the present invention provide an optical apparatus including the dual camera module.

Technical Solution

In one general aspect of the present invention, there is provided a dual camera module, the dual camera module comprising:

a first camera module including a first lens module and a first image sensor disposed below the first lens module; and a second camera module including a second lens module and a second image sensor disposed below the second lens module, wherein the second camera module has a wider angle of view than the first camera module, and the second image sensor is disposed at a position higher than the first image sensor.

Preferably, but not necessarily, the first camera module may further include a first housing accommodating, at an inside thereof, at least a part of the first lens module, and the second camera module may further include a second housing accommodating, at an inside thereof, at least a part of the second lens module at an inside, wherein an upper end of the first housing may be disposed at a height of a position corresponding to that of the second housing.

Preferably, but not necessarily, the first camera module may further include a first substrate coupled by the first image sensor, the second camera module may further include a second substrate coupled by the second image sensor, wherein the second substrate is disposed at an upper surface of the first substrate.

Preferably, but not necessarily, the first image sensor may be disposed at an upper surface of the first substrate, and the second image sensor may be disposed at an upper surface of the second substrate.

Preferably, but not necessarily, the first camera module may further include a first driving part coupled with the first lens module and a second driving part spaced apart from the first driving part to move the first lens module through an electromagnetic interaction with the first driving part, the second camera module may further include a third driving part coupled with the second lens module and a fourth driving part spaced apart from the third driving part to move the second lens module through an electromagnetic interaction with the third driving part, wherein an upper end of the first lens module may be protruded further upward than an upper end of the first housing in response to movement of the first lens module.

Preferably, but not necessarily, the second substrate may be fixed to an upper surface of the first substrate through a non-conductive adhesive.

Preferably, but not necessarily, alignment between an optical axis of the first camera module and an optical axis of the second camera module may be adjusted by the adhesive.

Preferably, but not necessarily, the first housing may be disposed by being spaced apart from the second housing.

Preferably, but not necessarily, the second camera module may be shorter in EFL (Effective Focal Length) or TTL (Total Track Length) than the first camera module.

Preferably, but not necessarily, each thickness of the first substrate and the second substrate may be in the range of 0.4 mm~0.6 mm.

Preferably, but not necessarily, thickness of the adhesive may be in the range of 0.03 mm~0.5 mm.

Preferably, but not necessarily, the first camera module may further include a first substrate coupled by the first image sensor, and the second camera module may further include a second substrate coupled by the second image sensor, wherein the thickness of the second substrate may be thicker than that of the first substrate.

Preferably, but not necessarily, the first substrate and the second substrate may be integrally formed.

Preferably, but not necessarily, the second image sensor may be mounted at an upper surface of the second substrate, and the second image sensor may be mounted at a bottom surface of the first substrate by a flip chip method.

Preferably, but not necessarily, the first camera module may further include a third substrate coupled to the first substrate and extended to an outside, wherein the first substrate may include a cavity accommodated by at least a part of the third substrate.

In another general aspect of the present invention, there is provided an optical apparatus, the apparatus comprising: a cover member forming an exterior look, a display part disposed at the cover member and a dual camera module accommodated into the cover member, wherein the dual camera module includes:

a first camera module including a first lens module and a first image sensor disposed below the first lens module; and a second camera module including a second lens module and a second image sensor disposed below the second lens module, wherein the second camera module has a wider angle of view than the first camera module, and the second image sensor is disposed at a position higher than the first image sensor.

Preferably, but not necessarily, a distance between the cover member and the first image sensor may be longer than a distance between the cover member and the second image sensor.

Preferably, but not necessarily, the first camera module may further include a first housing accommodating, at an inside thereof, at least a part of the first lens module, and the second camera module may further include a second housing accommodating, at an inside thereof, at least a part of the second lens module at an inside, wherein a distance between an upper end of the first housing and the cover member may correspond to a distance between an upper end of the second housing and the cover member.

Preferably, but not necessarily, the optical apparatus may further comprise a Poron contacting the cover member.

Preferably, but not necessarily, the optical apparatus may further comprise:

a first window part so formed as to pass through the cover member and disposed at an upper side of the first lens module; and a second window part so formed as to pass through the cover member and disposed at an upper side of the second lens module, wherein the second window part may have a broader area than the first window part.

In still another general aspect of the present invention, there is provided with a dual camera module, the dual camera module comprising:

a first camera module;

a second camera module having a wider angle of view than the first camera module;

a first substrate mounted at an upper surface with an image sensor of the first camera module;

a second substrate mounted at an upper surface with an image sensor of the second camera module, wherein the second substrate may be disposed at an upper surface of the first substrate.

Preferably, but not necessarily, height of an upper end of a housing at the first camera module may correspond to height of an upper end of a housing at the second camera module.

Preferably, but not necessarily, the first camera module may include a lens module disposed at an inner space of the housing, wherein the lens module moves to a vertical direction which is an optical axis direction in order to perform an auto focusing function, and an upper end of the lens module may farther protrude than an upper end of the housing in response to movement of the lens module.

Preferably, but not necessarily, the second substrate may be fixed to one surface of the first substrate through a non-conductive adhesive.

Preferably, but not necessarily, alignment between an optical axis of the first camera module and an optical axis of the second camera module may be adjusted by the adhesive.

Preferably, but not necessarily, the first camera module may be disposed by being spaced apart from the second camera module.

Preferably, but not necessarily, the second camera module may be shorter in EFL (Effective Focal Length) or TTL (Total Track Length) than the first camera module.

Preferably, but not necessarily, each vertical direction thickness of the first substrate and the second substrate may be in the range of 0.4 mm~0.6 mm.

Preferably, but not necessarily, vertical direction thickness of the adhesive may be in the range of 0.03 mm~0.5 mm.

In another general aspect of present invention, there is provided with an optical apparatus, the optical apparatus comprising:

a main body;

a display part arranged at one surface of the main body to display information; and a dual camera module disposed at the main body to photograph an image or a photograph, wherein the dual camera module includes:

a first camera module;

a second camera module having a wider angle of view than the first camera module;

a first substrate mounted at an upper surface with an image sensor of the first camera module;

a second substrate mounted at an upper surface with an image sensor of the second camera module, wherein the second substrate may be disposed at an upper surface of the first substrate.

Preferably, but not necessarily, the optical apparatus may further comprise a cover member disposed at an upper side of the first camera module and at an upper side of the second camera module, and a distance between the second substrate and the cover member may be shorter than a distance between the first substrate and the cover member.

Preferably, but not necessarily, a distance between an upper end of a housing at the first camera module and the cover member may correspond to a distance between an upper end of a housing at the second camera module and the cover member.

Preferably, but not necessarily, the first camera module may include a lens module disposed at an inner space of a housing at the first camera module, wherein the lens module may move to a vertical direction which is an optical axis direction in order to perform an auto focus function, and an upper end of the lens module may be further protrude than an upper end of the housing in response to movement of the lens module.

Preferably, but not necessarily, a connection member may be disposed between the first housing and the cover member in order to fix the first housing to the cover member.

Preferably, but not necessarily, the connection member may include a Poron.

Preferably, but not necessarily, the optical apparatus may further comprise:

a first window part disposed at the cover member to allow a transmitted light to proceed to the first camera module; and a second window part disposed at the cover member to allow a transmitted light to proceed to the second camera module, wherein the second window part may have a broader area than the first window part in order to obtain a wider angle of view than the first window part.

In still further general aspect of the present invention, there is provided a dual camera module, the dual camera module comprising:

a first camera module;

a second camera module having a wider angle of view than the first camera module;

a substrate mounted with a first image sensor of the first camera module and a second image sensor of the second camera module; wherein thickness of the substrate may be such that a part mounted with the first image sensor may be thinner than a portion mounted with the second image sensor.

Preferably, but not necessarily, height of an upper end of a housing at the first camera module may correspond to height of an upper end of a housing at the second camera module.

Preferably, but not necessarily, the substrate may include a first circuit layer, a second circuit layer disposed at an upper side of the first substrate layer, wherein the first image sensor may be mounted on the first circuit layer, and the second image sensor may be mounted on the second image sensor.

Preferably, but not necessarily, each thickness of the first circuit layer and the second circuit layer may be in the range of 0.2 mm~0.3 mm.

Preferably, but not necessarily, the second circuit layer may be omitted at a portion corresponding to a portion where the first image sensor is mounted on the first circuit layer.

Preferably, but not necessarily, the second image sensor may be mounted at an upper surface of the substrate, and the first image sensor may be mounted at a bottom surface of the substrate in a flip-flop method.

Preferably, but not necessarily, the first camera module may include a lens module disposed at an inner space of a housing, wherein the lens module may move to a vertical direction which is an optical axis direction in order to perform an auto focus function, and an upper end of the lens module may be further protrude than an upper end of the housing in response to movement of the lens module.

Preferably, but not necessarily, the first camera module and the second camera module may be disposed by being spaced apart.

Preferably, but not necessarily, the second camera module may be shorter in EFL (Effective Focal Length) or TTL (Total Track Length) than the first camera module.

In still another general aspect of present invention, there is provided with an optical apparatus, the optical apparatus comprising:

a main body;

a display part arranged at one surface of the main body to display information; and a dual camera module disposed at the main body to photograph an image or a photograph, wherein the dual camera module includes:

a first camera module;

a second camera module having a wider angle of view than the first camera module;

a substrate mounted with a first image sensor of the first camera module and a second image sensor of the second camera module, wherein the first image sensor may be disposed at a farther bottom side than the second image sensor.

Preferably, but not necessarily, the optical apparatus may further comprise: a cover member disposed at an upper side of the first camera module and at an upper side of the second camera module, wherein a distance between the first image sensor and the cover member may correspond to a distance between an upper end of the housing at the second camera module and the cover member.

Preferably, but not necessarily, the first camera module may include a lens module disposed at an inner space of the housing at the first camera module, wherein the lens module may move to a vertical direction which is an optical axis direction in order to perform an auto focus function, and an upper end of the lens module may be further protrude than an upper end of the housing in response to movement of the lens module.

Preferably, but not necessarily, a connection member may be disposed between the first housing and the cover member in order to fix the first housing to the cover member.

Preferably, but not necessarily, the connection member may include a Poron.

Preferably, but not necessarily, the optical apparatus may further comprise:

a first window part disposed at the cover member to allow a transmitted light to proceed to the first camera module; and a second window part disposed at the cover member to allow a transmitted light to proceed to the second camera module, wherein the second window may have a broader area than the first window part in order to obtain a wider angle of view than the first window part.

In still further general aspect of the present invention, there is provided a dual camera module, the dual camera module comprising:

a first camera module;

a second camera module having a wider angle of view than the first camera module;

a first substrate mounted at an upper surface of an image sensor of the first camera module;

a second substrate mounted at an upper surface of an image sensor of the second camera module and disposed at an upper surface of the first substrate; and a third substrate electrically connected to the first substrate, wherein the first substrate may include a cavity accommodating at least a portion of the third substrate.

Preferably, but not necessarily, the third substrate may include a coupling part accommodated into the cavity, wherein the coupling part may be coupled to the first substrate using an ACF (Anistropic Conductive Film).

Preferably, but not necessarily, the first substrate may have rigidity, and the third substrate may have flexibility.

Preferably, but not necessarily, the first substrate may include a ceramic PCB (Printed Circuit Board).

Preferably, but not necessarily, the first substrate, the second substrate and the third substrate may be overlapped at least at a portion thereof toward a vertical direction.

Preferably, but not necessarily, the second substrate may be fixed to an upper surface of the first substrate through a non-conductive adhesive.

Preferably, but not necessarily, an alignment between an optical axis of the first camera module and an optical axis of the second camera module may be adjusted in the process of the second substrate being adhered to the first substrate using the adhesive.

Preferably, but not necessarily, at least a portion of the third substrate may be disposed between the adhesive and the first substrate.

Preferably, but not necessarily, the cavity may be disposed at an upper surface of the first substrate.

Preferably, but not necessarily, the cavity may be disposed at a bottom surface of the first substrate.

Preferably, but not necessarily, the dual camera module may further comprise a fourth substrate electrically connected to the second substrate, and the second substrate and the fourth substrate may be formed by a Rigid Flexible PCB.

Preferably, but not necessarily, the first camera module may include a lens module disposed at an inner space of the housing, wherein the lens module may move to a vertical direction which is an optical axis direction for performing an auto focusing function, and an upper end of the lens module may be farther protruded than an upper end of the housing in response to movement of the lens module.

Preferably, but not necessarily, the first camera module and the second camera module may be disposed by being spaced apart.

Preferably, but not necessarily, the second camera module may be shorter in EFL (Effective Focal Length) or TTL (Total Track Length) than the first camera module.

Preferably, but not necessarily, each vertical thickness of the first substrate and the second substrate may be in the range of 0.4 mm~0.6 mm.

Preferably, but not necessarily, a vertical thickness of the cavity may be in the range of 0.2 mm~0.3 mm.

In still further general aspect of the present invention, there is provided an optical apparatus, the optical apparatus comprising:

a main body;

a display part arranged at one surface of the main body to display information; and a dual camera module disposed at the main body to photograph an image or a photograph, wherein the dual camera module includes:

a first camera module;

a second camera module having a wider angle of view than the first camera module;

a first substrate mounted at an upper surface with an image sensor of the first camera module;

a second substrate mounted at an upper surface with an image sensor of the second camera module; and a third substrate electrically connected to the first substrate, wherein the first substrate includes a cavity accommodated with at least a portion of the third substrate.

Advantageous Effects of the Invention

The exemplary embodiments are advantageous in the aspect of design because an inner structural exposure of wide angle camera module is minimized. Furthermore, The exemplary embodiments are advantageous in that attachment of Poron is made easy that performs foreign object infuse prevention function and camera module fixing function relative to a cover member.

Furthermore, a reduced total length of dual camera module can be provided to miniaturize an optical apparatus.

BEST MODE

Figure 1:
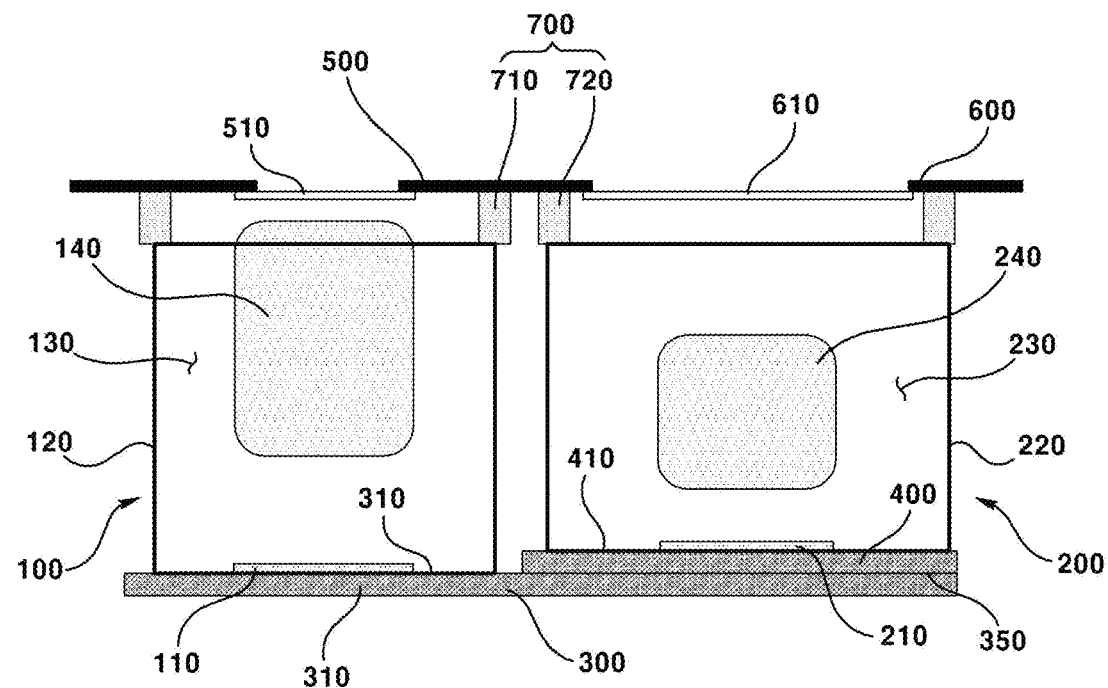
FIGS. 1 and 2 are conceptual view illustrating a dual camera module according to an exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled", and "connected" may mean that two or more elements do not contact each other but are indirectly joined together via another element or intermediate elements.

An "optical axis direction" as used hereinafter is defined as an optical axis direction of a lens module in a state of being coupled to a lens driving unit. Meantime, the "optical axis direction" may be interchangeably used with a vertical direction and z axis direction.

An "auto focus function" as used hereinafter is defined as a function of matching a focus relative to an object by adjusting a distance from an image sensor by moving to an optical axis direction a lens module in response to a distance to the object in order to obtain a clear image of the object on the image sensor. Meantime, the "auto focus" may be interchangeably used with "AF".

A "handshake correction function" as used hereinafter is defined as a function of moving or tilting a lens module to a direction perpendicular to an optical axis direction in order to offset vibration (movement) generated on the image sensor by an external force. Meantime, the "handshake correction" may be interchangeably used with an "OIS (Optical Image Stabilization)".

Now, a configuration of an optical apparatus according to an exemplary embodiment of the present invention will be described hereinafter.

The optical apparatus according to an exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus according to an exemplary embodiment of the present invention may include a main body (not shown), a display part (not shown) arranged at one surface of the main body to display information, and a camera having a dual camera module (not shown) disposed at the main body to photograph an image or a photograph.

Hereinafter, configuration of dual camera module according to an exemplary embodiment of the present invention will be described.

Figure 2:
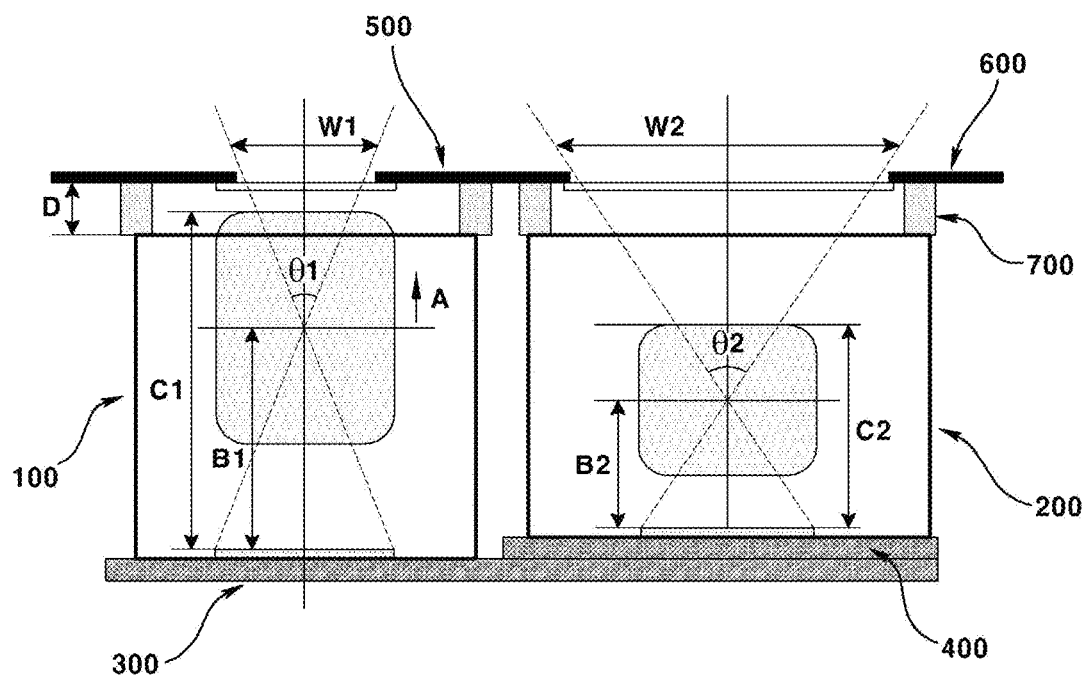

FIGS. 1 and 2 are conceptual view illustrating a dual camera module according to an exemplary embodiment of the present invention.

Referring to FIGS. 1 and 2, the dual camera module according to an exemplary embodiment of the present invention may include a first camera module (100) and a second camera module (200). Meantime, the dual camera module according to an exemplary embodiment of the present invention may further include a first cover member (500) to cover the first camera module (100). Furthermore, the dual camera module according to an exemplary embodiment of the present invention may further include a second cover member (600) to cover the second camera module (200).

In addition, the dual camera module according to an exemplary embodiment of the present invention may further include a first substrate (300) mounted with a first image sensor (110) of the first camera module (100). Furthermore, the dual camera module according to an exemplary embodiment of the present invention may further include a second substrate (300) mounted with a second image sensor (210) of the second camera module (200).

Here, the first cover member (500) and the first substrate (300) may be formed by using the first camera module (100), and may be also formed by a member separate from the first camera module (100). Furthermore, a second cover member (600) and the second substrate (400) may be formed by using the second camera module (200), and may be also formed by a member separate from the second camera module (200). Hereinafter, although the first cover member (500) and the second cover member (600) are described as separate members, the first cover member (500) and the second cover member (600) may be one configuration by being integrally formed.

The first camera module (100) may be a narrow angle camera module. In other words, the first camera module (100) may be narrower in view angle than the second camera module (200). That is, a view angle (θ1) of the first camera module (100) may be narrower than a view angle (θ2) of the second camera module (200). An EFL (Effective Focal Length, B1) of the first camera module (100) may be longer than an EFL (B2) of the second camera module (200). Furthermore, a TTL (Total Track Length, C1) of the first camera module (100) may be longer than a TTL (C2) of the second camera module (200).

The first camera module (100) may include a first image sensor (110), a first housing (120), a first inner side space (130) and a first lens module (140).

The first image sensor (110) may obtain a light incident through a first lens module (140) of the first camera module (100). The first image sensor (110) may be mounted on the first substrate (300). The first image sensor (110) may be disposed to match with the first lens module (140) at the optical axis, whereby the first image sensor (110) can output as an image by obtaining a light having passed the first lens module (140). The first image sensor (110), may be a CCD (Charge Coupled Device), a MOS (Metal Oxide Semiconductor), a CPD or a CID, for example. However, the present invention is not limited to the given types of image sensor and may include other types of image sensors.

A first housing (120) may be disposed between the first substrate (300) and the first cover member (500). The first housing (120) may form therein a first inner side space (130) to accommodate the first lens module (140). The first inner side space (130) may be interposed between the first substrate (300) and the first cover member (500). The first inner side space (130) may be disposed with the first lens module (140). The first inner side space (130) may be formed to obtain a moving space (D) of the first lens module (140) in order to perform the AF (Auto Focus) function. The moving space (D) may be formed by a connector (700) disposed between the first cover member (500) and the first housing (120).

The first lens module (140) may be disposed at the first inner side space (130). The first lens module (140) may move to an optical axis direction (A, vertical direction) in order to perform the AF function. At this time, the movement of the first lens module (140) may be performed by the electromagnetic interaction.

For example, the movement control of the first lens module (140) may be implemented through a power application control to a coil by allowing the first lens module (140) to be disposed with a magnet (not shown), and the first housing (120) to be disposed with the coil (not shown). Furthermore, the first lens module (140) may be disposed with the coil and the first housing (120) may be disposed with a magnet. The optical axis of the first lens module (140) may match an optical axis of the first image sensor (110). The optical axis of the first lens module (140) may be parallel with an optical axis of a second lens module (240).

The first lens module (140) may move to a vertical direction which is an optical axis direction in order to perform the AF function. Furthermore, an upper end of the first lens module (140) may farther protrude over an upper end of the first housing (120) in response to the movement of the first lens module (140). Furthermore, the first lens module (140) may farther protrude over an upper end of the first housing (120) in an initial state where no current is supplied to the first camera module (100). In an example of the present invention, a connection part (700) may be interposed between the cover members (500, 600) and the first housing (120) in order to secure a moving space of the first lens module (140). That is, the connector (700) may expand a movable space of the first lens module (140).

The second camera module (200) may be a wide angle camera module. The second camera module (200) may be a wide angle camera module. In other words, the second camera module (200) may be wider in view angle than the first camera module (100). That is, a view angle (θ2) of the second camera module (200) may be wider than a view angle (θ1) of the first camera module (100). An EFL (Effective Focal Length, B2) of the second camera module (200) may be shorter than an EFL (B1) of the first camera module (100). Furthermore, a TTL (Total Track Length, C2) of the second camera module (200) may be shorter than a TTL (C1) of the first camera module (100).

The second camera module (200) may be arranged in parallel with the first camera module (100). An optical axis of the second camera module (200) may be aligned with an optical axis of the first camera module (100). The optical axis of the second camera module (200) may be in parallel with the optical axis of the first camera module (100). The second camera module (200) may be spaced apart from the first camera module (100). Furthermore, the second camera module (200) may be so disposed as to abut the first camera module (100).

The second camera module (200) may include a second image sensor (210), a second housing (220), a second inner side space (230) and a second lens module (240).

The second image sensor (210) may obtain a light incident through a second lens module (240) of the second camera module (200). The second image sensor (210) may be mounted on the second substrate (400). The second image sensor (210) may be disposed to match with the second lens module (240) at the optical axis, whereby the second image sensor (210) can output as an image by obtaining a light having passed the second lens module (240). The second image sensor (210) may be a CCD (Charge Coupled Device), a MOS (Metal Oxide Semiconductor), a CPD or a CID, for example. However, the present invention is not limited to the given types of image sensors and may include other types of image sensors.

The second housing (220) may be disposed between the second substrate (400) and the second cover member (600). The second housing (220) may form therein a second inner side space (230) to accommodate the second lens module (240). The second inner side space (230) may be formed inside of the second housing (220).

The inner side space (230) may be disposed between the second substrate (400) and the second cover member (600). The second inner side space (230) may be disposed with the second lens module (240). The second inner side space (230) may be formed with a moving space of the second lens module (240) in order to perform the AF function.

The second lens module (240) may be disposed at the second inner side space (230). The second lens module (240) may move to an optical axis direction (vertical direction) in order to perform the AF function. At this time, the movement of the second lens module (240) may be implemented by electromagnetic interaction. For example, the movement control of the second lens module (240) may be implemented by power application control relative to the coil while the second lens module (240) is disposed with a magnet (not shown), and the second housing (220) is disposed with a coil (not shown). Furthermore, the second lens module (240) may be disposed with a coil and the second housing (220) may be disposed with a magnet. The optical axis of the second lens module (240) may match to that of the second image sensor (210). The optical axis of the second lens module (240) may be in parallel with that of the first lens module (140).

The first substrate (300) may be mounted with the first image sensor (110) of the first camera module (100). That is, the first substrate (300) may transmit an image to an outside by outputting the image obtained through the first image sensor (110). An upper surface (310) of the first substrate (300) may be mounted with the first image sensor (110). The upper surface (310) of the first substrate (300) may be mounted with a second substrate (400). Through this configuration, the second image sensor (210) of the second substrate (400) may be disposed higher than the first image sensor (110) mounted on the first substrate (300). That is, the second image sensor (210) may be disposed closer to the cover members (500, 600) than the first image sensor (110).

The first substrate (300) may supply a power to the first camera module (100). Meantime, the first substrate (300) may be disposed with a first controller (not shown) in order to control the first camera module (100). The first controller may be mounted on the first substrate (300). Meantime, the first controller may control a direction, intensity and amplitude of current supplied to each component forming the first camera module (100). The first controller may perform at least one of the AF function and a handshake correction function of the camera module by controlling the first camera module (100). That is, the first controller may move the lens module to an optical axis direction or to a direction perpendicular to the optical axis direction or tilt the lens module by controlling the first camera module (100). Furthermore, the first controller may perform a feedback control of AF function and handshake correction function relative to the first camera module (100).

An adhesive (350) may be interposed between the first substrate (300) and the second substrate (400). At this time, the adhesive (350) may be formed with a non-conductive material. Thus, each of the first substrate (300) and the second substrate (400) may be separately connected to an outside power surface. However, the adhesive (350) may be a conductive material. Each of the first substrate (300) and the second substrate (400) may have a vertical thickness of 0.4~0.6 mm. Furthermore, the first substrate (300) and the second substrate (400) may be bonded using an adhesive (350) formed with epoxy, where the thickness of epoxy may be 0.03~0.5 mm.

The adhesive (350) may fix the first substrate (300) to the second substrate (400). The second substrate (400) may be such that an optical axis alignment with the first substrate (300) can be adjusted in the course of adhering the first substrate (300) using the adhesive (350). That is, an alignment between an optical axis of the first camera module (100) and an optical axis of the second camera module (200) may be adjusted by the adhesive (350). For example, the second substrate (400) may be movably adhered to the first substrate (300) using an initially hardened adhesive (350) where the optical axis may be aligned and the second substrate (400) may be fixed by using a finally hardened adhesive (350). The adhesive (350) may be a non-conductive material, for example. That is, the first substrate (300) and the second substrate (400) may not be electrically conductive.

The second substrate (400) may be mounted with the second image sensor (210) of the second camera module (200). That is, the second substrate (400) may transmit an image obtained through the second image sensor (210) to an outside. The second substrate (400) may be mounted at an upper surface with the second image sensor (210). The second substrate (400) may be adhered at a bottom surface to the upper surface (310). Through this configuration, the second image sensor (410) mounted on the second substrate (400) may be more closely positioned to the cover member (500, 600) than the first image sensor (110) mounted on the first substrate (300).

The second substrate (400) may supply a power to the second camera module (200). Meantime, the second substrate (400) may be disposed with a second controller (not shown) in order to control the second camera module (200). The second controller may be mounted on the second substrate (400). Meantime, the second controller may be disposed at an inner side of the second housing (220).

The second controller may control a direction, intensity and amplitude of current supplied to each component forming the second camera module (200). The second controller may perform at least one of the AF function and a handshake correction function of the camera module by controlling the second camera module (200). That is, the second controller may move the lens module to an optical axis direction or to a direction perpendicular to the optical axis direction or tilt the lens module by controlling the second camera module (200). Furthermore, the second controller may perform a feedback control of AF function and handshake correction function relative to the second camera module (200).

The first cover member (500) may be disposed at an upper side of the first camera module (100). The first cover member (500) may protect the first camera module (100) from outside. Meanwhile, the first cover member (500) may form an external look of the dual camera module. The first cover member (500) may be disposed with a first window part (510).

The first window part (510) may be disposed with a first cover member (500). The first window part (510) may have a narrower area than a second window part (610). This is for the first window part (510) to obtain a narrower view angle than the second window part (610). The first window part (510) may be formed with a material capable of transmitting a light. That is, a light having passed the first window part (510) may be obtained by the first image sensor (110) through the first lens module (140).

The second cover member (600) may be disposed at an upper side of the second camera module (200). The second cover member (600) may protect the second camera module (200) from the outside. Meanwhile, the second cover member (600) may form an external look of the dual camera module. The second cover member (600) may be formed to have a same height as that of the first cover member (500). The first cover member (500) and the second cover member (600) may be integrally formed. The first cover member (500) may be disposed with the first window part (510). The second cover member (600) may be disposed with the second window part (610). The first cover member (500) and the second cover member (600) may form a main body of the optical apparatus. That is, the first cover member (500) and the second cover member (600) may form an external look of the optical apparatus.

The second window part (610) may be disposed at the second cover member (600). The second window part (610) may have a broader area than the first window part (510). That is, a width (w2) of the second window part (610) may be longer than a width (w1) of the first window part (510). The second window part (610) may have a broader area than the first window part (510). This is for the second window part (610) to obtain a wider view angle than the first window part (510). The second window part (610) may be formed with a material capable of transmitting a light. That is, a light having passed the second window part (610) may be obtained by the second image sensor (210) through the second lens module (240).

Although the foregoing description has explained the present invention by dividing the first cover member (500) and the second cover member (600), the first cover member (500) and the second cover member (600) may be integrally formed. In this case, the first cover member (500) and the second cover member (600) may be called as cover member (500, 600). Meantime, although the cover member (500, 600) has been explained as one configuration of the dual camera module, the cover member (500, 600) may be separately configured. For example, the cover member (500, 600) may form an external look of the optical apparatus as one configuration.

The dual camera module according to an exemplary embodiment of the present invention may further comprise a camera module (100, 200) and a connector (700) connecting the cover members (500, 600).

The connector (700) may be interposed between the housing (120, 220) of the camera module (100, 200) and the cover member (500, 600). The connector (700) may fix the housing (120, 220) to the cover member (500, 600). Meantime, the connector (700) may fix cover member (500, 600) to the housing (120, 220). The connector (700) may be Poron, for example. In this case, the connector (700) formed with the Poron may not only provide a fixing power to the housing (120, 220) and to the cover member (500, 600) but also perform a light shield effect, a cushioning effect and a foreign object prevention effect. The connector (700) may include a first connector (710) and a second connector (720).

The first connector (710) may be interposed between the first housing (120) and the first cover member (500). The first connector (710) may fix the first housing (120) to the first cover member (500). Meantime, the first connector (710) may fix the first cover member (500) to the first housing (120).

The second connector (720) may be interposed between the second housing (220) and the second cover member (600). The second connector (720) may fix the second housing (220) to the second cover member (600). Meantime, the second connector (720) may fix the second cover member (600) to the second housing (220).

Figure 3A:
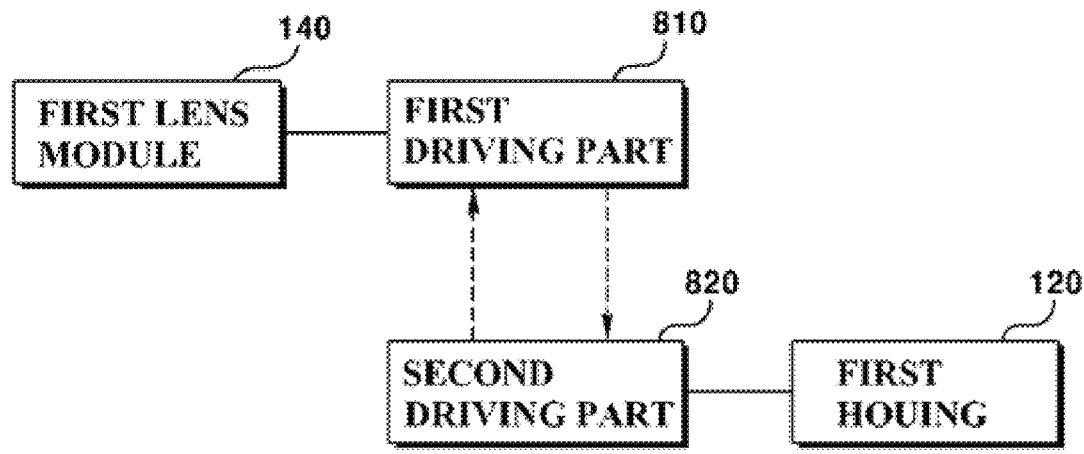
FIGS. 3A and 3B are schematic diagrams illustrating a dual camera module according to an exemplary embodiment of the present invention.
Figure 3B:
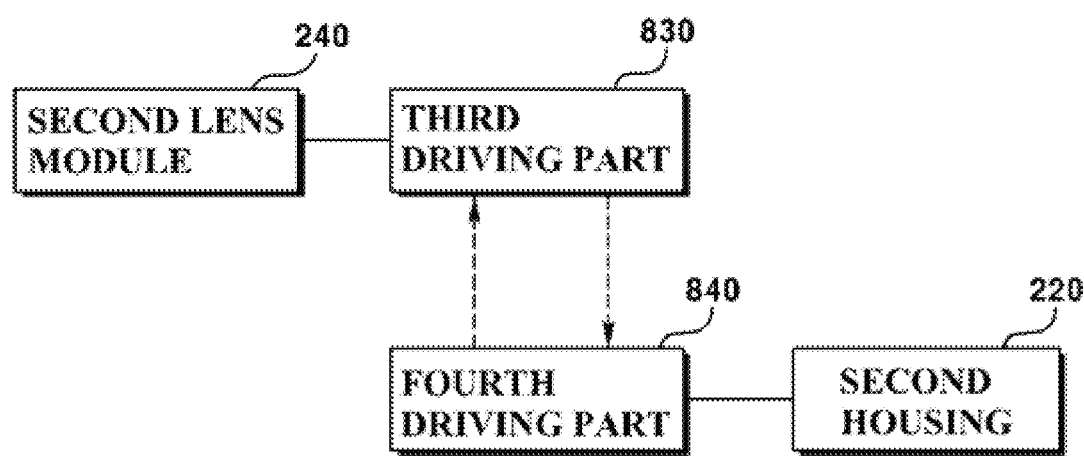

FIGS. 3A and 3B are schematic diagrams illustrating a dual camera module according to an exemplary embodiment of the present invention.

The first camera module (100) may include a first driving part (810) coupled to the first lens module (140). The first driving part (810) may be coupled to the first lens module (140). The first driving part (810) may be coupled to an outside surface of a bobbin (not shown) coupled to the first lens module (140). The first driving part (810) may include a second driving part (820) facing the first driving part (810). The second driving part (820) may face the first driving part (810). The second driving part (820) may electromagnetically interact with the first driving part (810).

The second driving part (820) may move the first lens module (140) through the electromagnetic interaction with the first driving part (810). The second driving part (820) may be spaced apart from the first driving part (810). The second driving part (820) may be coupled to the first housing (120). The first driving part (810) may include a coil, and the second driving part (820) may include a magnet. Alternatively, the second driving part (820) may include a coil and the first driving part (810) may include a magnet.

The second camera module (200) may include a third driving part (830) coupled to the second lens module (240). The third driving part (830) may be coupled to the second lens module (240). The third driving part (830) may be coupled to an outside surface of a bobbin (not shown) coupled to the second lens module (240). The second camera module (200) may include a fourth driving part (840) facing the third driving part (830). The fourth driving part (840) may face the third driving part (830). The fourth driving part (840) may electromagnetically interact with the third driving part (830).

The fourth driving part (840) may move the second lens module (240) through the electromagnetic interaction with the third driving part (830). The fourth driving part (840) may be spaced apart from the third driving part (830). The fourth driving part (840) may be coupled to the second housing (220). The third driving part (830) may include a coil, and the fourth driving part (840) may include a magnet. Alternatively, the fourth driving part (840) may include a coil and the third driving part (830) may include a magnet.

Hereinafter, operation and effect of dual camera module according to an exemplary embodiment of the present invention will be described.

FIGS. 1 and 2 are conceptual view illustrating a dual camera module according to an exemplary embodiment of the present invention.

The first camera module (100) may be called as a narrow angle camera module (100) because of having a narrower view angle than the second camera module (200), and then second camera module (200) may be called as wide angle camera module (200) because of having a wider view angle than the first camera module (100). The lens module (140) of the narrow angle camera module (100) may function as a telephoto lens, and the lens module (240) of wide angle camera module (200) may function as a wide angle lens.

First of all, the dual camera module can function while an optical axis of the first camera module (100) and an optical axis of the second camera module (200) are aligned. The dual camera module according to an exemplary embodiment of the present invention may output an image obtained by the second camera module (200) when a user photographs an object of a short distance, and output an image obtained by the first camera module (100) when a user photographs an object of a long distance. Furthermore, the dual camera module according to an exemplary embodiment of the present invention may output an image obtained by the first camera module (100) and an image obtained by the second camera module (200), based on the distance of an object, by combining the image obtained by the first camera module (100) and the image obtained by the second camera module (200).

That is, the dual camera module according to an exemplary embodiment of the present invention may obtain objects positioned in a long distance or a close distance as images of clear quality. In other words, the dual camera module (100) according to an exemplary embodiment of the present invention can provide a corresponding function as that of a zoom lens even without an zoom lens.

Furthermore, the first image sensor (110) of the first camera module (100) is mounted on the first substrate (300) and the second image sensor (210) of the second camera module (200) is mounted on the second substrate (400) in the dual camera module according to an exemplary embodiment of the present invention, where the second substrate (400) is adhered to an upper surface of the first substrate (300), and as a result, the first image sensor (110) can be positioned closer to the cover member (500, 600) than the second image sensor (210).

In this case, a width (w2) of the second window part (610) that must obtain a view angle, which is a wide angle of the second camera module (200), may become relatively wider {compared with a case where the second images sensor (110) is mounted on the first substrate (300)}. That is, an area of the second window part (610) may be increased, whereby a phenomenon of an inner configuration of the second camera module (200) being exposed through the second window part (610) can be inhibited.

Furthermore, when the first substrate (300) is mounted with the second image sensor (210), a height of the second housing (220) may become lowered to require a separate additional member for fixing the Poron between the second housing (220) and the second cover member (600). However, in the dual camera module according to an exemplary embodiment of the present invention, a height at an upper end of the second housing (200) can be increased compared to the previous comparative example to advantageously fix the Poron without a separate additional member between the second housing (220) and the second cover member (600).

Hereinafter, an optical apparatus according to another exemplary embodiment of the present invention will be described.

The optical apparatus according to another exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus according to another exemplary embodiment of the present invention may include a main body, a display part arranged at one surface of the main body to display information, and a camera having a dual camera module (not shown) disposed at the main body to photograph an image or a photograph.

Hereinafter, configuration of a dual camera module according to another exemplary embodiment of the present invention will be described with reference to the drawings.

Figure 4:
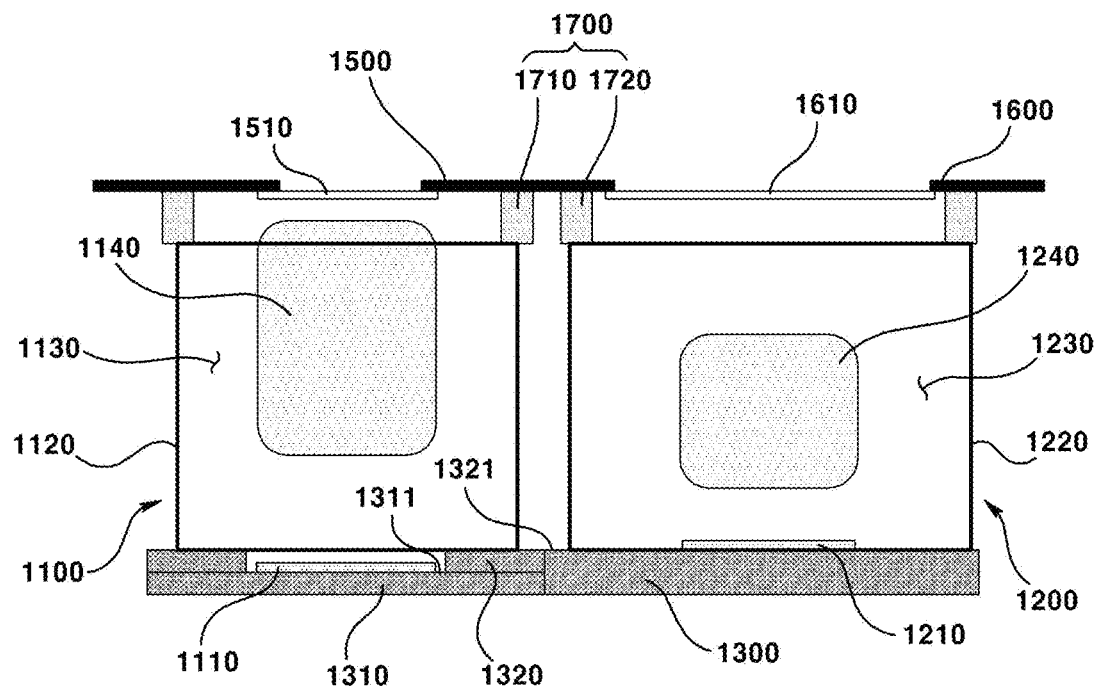
FIGS. 4 and 5 are conceptual views illustrating a dual camera module according to a modification of another exemplary embodiment of the present invention.
Figure 5:
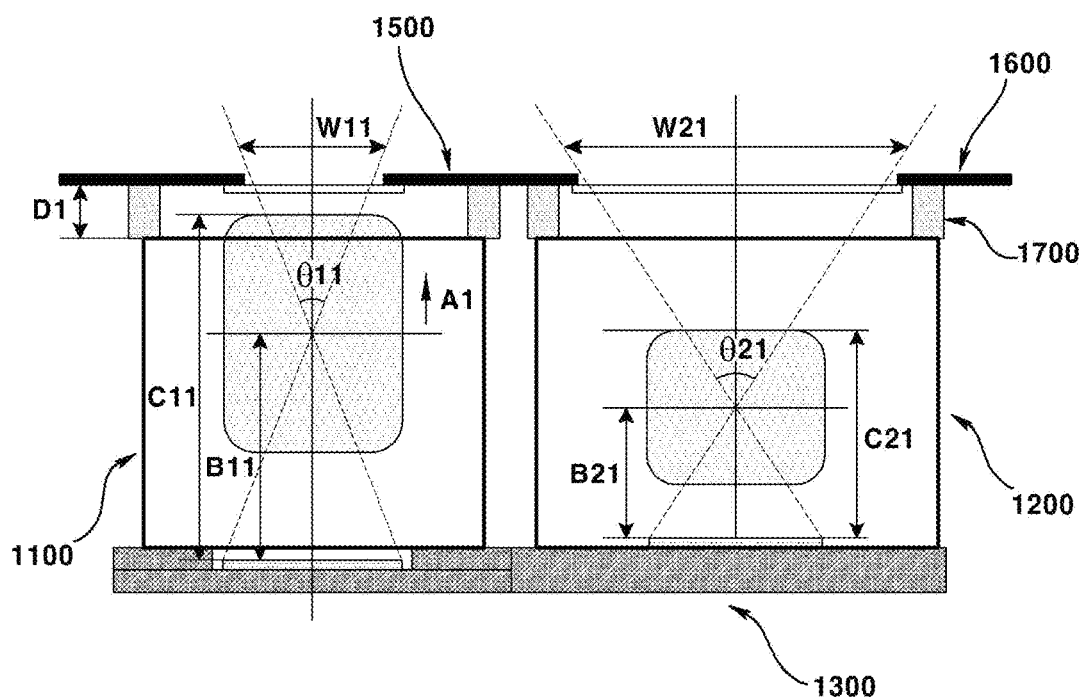

FIGS. 4 and 5 are conceptual views illustrating a dual camera module according to a modification of another exemplary embodiment of the present invention.

Referring to FIGS. 4 and 5, a dual camera module according to a modification of another exemplary embodiment of the present invention may include a first camera module (1100) and a second camera module (1200). Meantime, the dual camera module according to a modification of another exemplary embodiment of the present invention may further include a first cover member (1500) to cover the first camera module (1100).

The dual camera module according to a modification of another exemplary embodiment of the present invention may further include a second cover member (1600) to cover the second camera module (1100). Furthermore, the dual camera module according to a modification of another exemplary embodiment of the present invention may further include a substrate (1300) mounted with a first image sensor (1110) of the first camera module (1100), and a second image sensor (1210) of the second camera module (1200). Here, the first cover member (1500) and the substrate (1300) may be formed as one of configurations of the first camera module (1100), and may be formed as a member separate from the first camera module (1100). Furthermore, the second cover member (1600) and the substrate (1300) may be formed as one of configurations of the second camera module (1200), and may be formed as a member separate from the second camera module (1200).

The first camera module (1100) may be a narrow angle camera module. In other words, the first camera module (1100) may be narrower in view angle than the second camera module (1200). That is, a view angle ($\theta11$) of the first camera module (1100) may be narrower than a view angle ($\theta21$) of the second camera module (1200). An EFL (Effective Focal Length, B11) of the first camera module (1100) may be longer than an EFL (B21) of the second camera module (1200). Furthermore, a TTL (Total Track Length, C11) of the first camera module (1100) may be longer than a TTL (C21) of the second camera module (1200).

The first image sensor (1110) may obtain a light incident through the first lens module (1140) of the first camera module (1100). The first image sensor (1110) may be mounted on the substrate (1300). To be more specific, the first image sensor (1110) may be mounted on a first circuit layer (1310) of the substrate (1300). The first image sensor (1110) may be so disposed as to allow the first lens module (1140) to match an optical axis, through which the first image sensor (1110) may output a light having passed the first lens module (1140) and output the light as an image.

The first image sensor (1110) may be a CCD (Charge Coupled Device), a MOS (Metal Oxide Semiconductor), a CPD or a CID, for example. However, the present invention is not limited to the given types of image sensor and may include other types of image sensors.

A first housing (1120) may be disposed between the substrate (1300) and the first cover member (1500). The first housing (1120) may form therein a first inner side space (1130) to accommodate the first lens module (1140). The first inner side space (1130) may be formed at an inside of the first housing (1120). The first inner side space (1130) may be interposed between the substrate (1300) and the first cover member (1500). The first inner side space (1130) may be disposed with the first lens module (1140).

The first inner side space (1130) may be so formed as to obtain a moving space (D1) of the first lens module (1140) in order to perform the AF (Auto Focus) function. The moving space (D1) of the first lens module (1140) may be formed by a connection part (1700) disposed between the first cover member (1500) and the first housing (1120).

The first lens module (1140) may be disposed at the first inner side space (1130). The first lens module (1140) may move to an optical axis direction (A1, vertical direction) in order to perform the AF function. At this time, the movement of the first lens module (1140) may be performed by the electromagnetic interaction.

For example, the movement control of the first lens module (1140) may be implemented through a power application control to a coil by allowing the first lens module (1140) to be disposed with a magnet (not shown), and the first housing (1120) to be disposed with the coil (not shown). Furthermore, the first lens module (1140) may be disposed with the coil and the first housing (1120) may be disposed with a magnet. The optical axis of the first lens module (1140) may match an optical axis of the first image sensor (1110). The optical axis of the first lens module (1140) may be parallel with an optical axis of a second lens module (1240).

The first lens module (1140) may move to a vertical direction, which is an optical axis direction, in order to perform the AF function. Furthermore, an upper end of the first lens module (1140) may farther protrude over an upper end of the first housing (1120) in response to the movement of the first lens module (1140). Furthermore, the first lens module (1140) may farther protrude over an upper end of the first housing (1120) in an initial state where no current is supplied to the first camera module (1100). In an example of the present invention, a connection part (1700) may be interposed between the cover members (1500, 1600) and the first housing (1120) in order to secure a moving space of the first lens module (1140). That is, the connection part (1700) may expand a movable space of the first lens module (1140).

The second camera module (1200) may be a wide angle camera module. In other words, the second camera module (1200) may be wider in view angle than the first camera module (1100). That is, a view angle (θ21) of the second camera module (1200) may be wider than a view angle (θ11) of the first camera module (1100). An EFL (Effective Focal Length, B21) of the second camera module (1200) may be shorter than an EFL (B11) of the first camera module (1100). Furthermore, a TTL (Total Track Length, C21) of the second camera module (1200) may be shorter than a TTL (C11) of the first camera module (1100).

The second camera module (1200) may be arranged in parallel with the first camera module (1100). An optical axis of the second camera module (1200) may be aligned with an optical axis of the first camera module (1100). The optical axis of the second camera module (1200) may be in parallel with the optical axis of the first camera module (1100). The second camera module (1200) may be spaced apart from the first camera module (1100). Furthermore, the second camera module (1200) may be so disposed as to abut the first camera module (1100).

The second camera module (1200) may include a second image sensor (1210), a second housing (1220), a second inner side space (1230) and a second lens module (1240).

The second image sensor (1210) may obtain a light incident through a second lens module (1240) of the second camera module (1200). The second image sensor (1210) may be mounted on the substrate (1300). To be more specific, the second image sensor (1210) may be mounted on a second circuit layer (1320) of the substrate (1300). The second image sensor (1210) may be disposed to match with the second lens module (1240) at the optical axis, whereby the second image sensor (1210) can output a light as an image by obtaining the light having passed the second lens module (1240). The second image sensor (1210) may be a CCD (Charge Coupled Device), a MOS (Metal Oxide Semiconductor), a CPD or a CID, for example. However, the present invention is not limited to the given types of image sensors and may include other types of image sensors.

The second image sensor (1210) may be disposed at an upper side than the first image sensor (1110) to an optical axis direction. That is, the first image sensor (1110) may be disposed at a lower side than the second image sensor (1210) to the optical axis direction. In other words, the second image sensor (1210) may be disposed nearer to the cover member (1500, 1600) than the first image sensor (1110). Furthermore, the first image sensor (1110) may be disposed more distant from the cover member (1500, 1600) than the second image sensor (1210). To be more specific, the first image sensor (1110) may be mounted on a first circuit layer (1310) and the second image sensor (1210) may be mounted on a second circuit layer (1320) disposed at an upper side of the first circuit layer (1310).

The second housing (1220) may be disposed between the substrate (1300) and the second cover member (1600). The second housing (1220) may form therein a second inner side space (1230) to accommodate the second lens module (1240). The second inner side space (1230) may be formed inside of the second housing (1220). The inner side space (1230) may be disposed between the substrate (1300) and the second cover member (1600). The second inner side space (1230) may be disposed with the second lens module (1240). The second inner side space (1230) may be formed with a moving space of the second lens module (1240) in order to perform the AF function.

The second lens module (1240) may be disposed at the second inner side space (1230). The second lens module (1240) may move to an optical axis direction (vertical direction) in order to perform the AF function. At this time, the movement of the second lens module (1240) may be implemented by electromagnetic interaction.

For example, the movement control of the second lens module (1240) may be implemented by power application control relative to a coil while the second lens module (1240) is disposed with a magnet (not shown), and the second housing (1220) is disposed with a coil (not shown). Furthermore, the second lens module (1240) may be disposed with a coil and the second housing (1220) may be disposed with a magnet. The optical axis of the second lens module (1240) may match to that of the second image sensor (1210). The optical axis of the second lens module (1240) may be in parallel with that of the first lens module (1140).

The substrate (1300) may be mounted with the first image sensor (1110) of the first camera module (1100). Furthermore, the substrate (1300) may be mounted with the second image sensor (1210) of the second camera module (1200). To be more specific, the first circuit layer (1310) of the substrate (1300) may be mounted with the first image sensor (1110). Furthermore, the second circuit layer (1320) of the substrate (1300) may be mounted with the second image sensor (1210). The substrate (1300) may transmit to an outside an image obtained through the first image sensor (1110) and/or the second image sensor (1210).

The substrate (1300) may supply a power to the camera module (1100, 1200). Meantime, the substrate (1300) may be disposed with a controller (not shown) to control the camera module (1100, 1200). The controller may be mounted on the substrate (1300). Meantime, the controller may be disposed at an inside of the housing (1120, 1220). The controller may control direction, intensity and amplitude of a current supplied to each element of the camera module (1100, 1200). The controller may perform at least one of the AF function and handshake correction function by controlling the camera module (1100, 1200). That is, the controller may move the lens module to an optical axis direction or to a direction perpendicular to the optical axis direction or tilt the lens module by controlling the camera module (1100, 1200). Furthermore, the controller may perform a feedback control of AF function and handshake correction function relative to the camera module (1100, 1200).

The substrate (1300) may include a first circuit layer (1310) and a second circuit layer (1320) disposed at an upper side of the first circuit layer (1310). That is, the first circuit layer (1310) may be disposed at an upper surface (1311) with a first image sensor (1110). The first circuit layer (1310) may be disposed at an upper surface (1311) with the second circuit layer (1320). Through this construction, the second image sensor (1210) mounted on the second circuit layer (1320) may be disposed higher than the first image sensor (1110) mounted on the first circuit layer (1310).

The second circuit layer (1320) may be mounted with the second image sensor (1210) of the second camera module (1200). That is, the second circuit layer (1320) may be disposed at an upper surface (1321) with the second image sensor (1210). A bottom surface of the second circuit layer (1320) may be disposed on an upper surface (1311) of the first circuit layer (1310). The second circuit layer (1320) may take a shape omitted at a portion corresponding to a portion where the first image sensor (1110) is mounted on the first circuit layer (1310). That is, the first image sensor (1110) may be mounted on a portion where a portion of the second circuit layer (1320) may be removed from the substrate (1300) stacked with the first circuit layer (1310) and the second circuit layer (1320).

The first cover member (1500) may be disposed at an upper side of the first camera module (1100). The first cover member (1500) may protect the first camera module (1100) from an outside. Meantime, the first cover member (1500) may form an exterior look of the dual camera module. The first cover member (1500) may be disposed with a first window part (1510). The first window part (1510) may be disposed with the first cover member (1500). The first window part (1510) may have a narrower area than a second window part (1610). The first window part (1510) may obtain a narrow view angle than the second window part (1610). The first window part (1510) may be formed with a light-transmitting material. That is, the light having passed the first window part (1510) may be obtained by the first image sensor (1110) through a first lens module (1140). The second cover member (1600) may be disposed at an upper side of the second camera module (1200). The second cover member (1600) may protect the second camera module (1200) from an outside.

Meantime, the second member (1600) may form an external look of the dual camera module. The second cover member (1600) may be formed with a height same as that of the first cover member (1500). The first cover member (1500) and the second cover member (1600) may be integrally formed. The first cover member (1500) may be disposed with the first window part (1510). The second cover member (1600) may be disposed with the second window part (1610).

The second window part (1610) may be disposed with the second cover member (1600). The second window part (1610) may have an area broader than that of the first window part (1510). That is, a width (W21) of the second window part (1610) may be longer than a width (W11) of the first window part (1510). The second window part (1610) may have a broader area than the first window part (1510) in order to obtain a broader view angle than the first window part (1510). The second window part (1610) may be formed with a light-transmitting material. That is, the light having passed the second window part (1610) may be obtained by the second image sensor (1210) through a second lens module (1240).

Previously, although the first cover member (1500) and the second cover member (1600) have been divisibly explained, the first cover member (1500) and the second cover member (1600) may be integrally formed. In this case, the first cover member (1500) and the second cover member (1600) may be called as a cover member (1500, 1600). Meantime, although the cover member (1500, 1600) has been explained as one constitution of the dual camera module, the cover member (1500, 1600) may be explained as an element separate from the dual camera module. For example, the cover member (1500, 1600) may form an external look of an optical apparatus as one of the constitutional elements of optical apparatus.

The dual camera module according to another exemplary embodiment of the present invention may further comprise a connector (1700) connecting the camera module (1100, 1200) with the cover member (1500, 1600). The connector (1700) may be interposed between the housing (1120, 1220) of the camera module (1100, 1200) and the cover member (1500, 1600). The connector (1700) may fix the housing (1120, 1220) to the cover member (1500, 1600). Meantime, the connector (1700) may fix the cover member (1500, 1600) to the housing (1120, 1220). The connector (1700) may provide a fixing power between the housing (1120, 1220) and the cover member (1500, 1600) and may perform a light-shielding effect, a cushioning effect and a foreign object introduction prevention effect as well. The connector (1700) may include a first connector (1710) and a second connector (1720).

The first connector (1710) may be disposed between the first housing (1120) and the first cover member (1500). The first connector (1710) may fix the first housing (1120) to the first cover member (1500). Meantime, the first connector (1710) may fix the first cover member (1500) to the first housing (1120).

The second connector (1720) may be disposed between the second housing (1220) and the second cover member (1600). The second connector (1720) may fix the second housing (1220) to the second cover member (1600). Meantime, the second connector (1720) may fix the second cover member (1600) to the second housing (1220).

Hereinafter, operation and effect of the dual camera module according to another exemplary embodiment of the present invention will be described with the accompanying drawings.

FIGS. 4 and 5 are conceptual views illustrating a dual camera module according to a modification of another exemplary embodiment of the present invention.

The first camera module (1100) may be called as a narrow angle camera module (1100) because of having a narrower view angle over the second camera module (1200), and the second camera module (1200) may be called as a wide angle camera module (1200) because of having a wider view angle over the first camera module (1100). A lens module (1140) of the narrow angle camera module (1100) may function as a telephoto lens, and the lens module (1240) of wide angle camera module (1200) may function as a wide angle lens.

First of all, the dual camera module can function while an optical axis of the first camera module (1100) and an optical axis of the second camera module (1200) are aligned. The dual camera module according to an exemplary embodiment of the present invention may output an image obtained by the second camera module (1200) when a user photographs an object of a short distance, and output an image obtained by the first camera module (1100) when a user photographs an object of a long distance. Furthermore, the dual camera module according to an exemplary embodiment of the present invention may output an image obtained by the first camera module (1100) and an image obtained by the second camera module (1200), based on the distance of an object, by combining the image obtained by the first camera module (1100) and the image obtained by the second camera module (1200).

That is, the dual camera module according to an exemplary embodiment of the present invention may obtain objects positioned in a long distance or a close distance as images of clear quality. In other words, the dual camera module (1100) according to an exemplary embodiment of the present invention can provide a corresponding function as that of a zoom lens even without an zoom lens.

Furthermore, in the dual camera module according to an exemplary embodiment of the present invention, the first image sensor (1110) of the first camera module (1100) is mounted on the first circuit layer (1310) of the substrate (1300), and the second image sensor (1210) of the second camera module (1200) is mounted on the second circuit layer (1320) of the substrate (1300), where the second circuit layer (1320) is adhered to an upper surface of the first circuit layer (1310), and as a result, the first image sensor (1110) can be positioned closer to the cover member (1500, 1600) than the second image sensor (1210).

In this case, a width (w21) of the second window part (1610) that must obtain a view angle, which is a wide angle of the second camera module (1200), may become relatively narrower. That is, because an area of the second window part (1610) is reduced, a phenomenon of an inner configuration of the second camera module (1200) being exposed through the second window part (1610) can be inhibited.

Furthermore, when the first image sensor (1110) is mounted on the second circuit layer (1320) of the substrate (1300), a height of the second housing (1220) may also become lowered to increase a height of the cover member (1500, 1600) altogether. In this case, a separate additional member for fixing the Poron between the second housing (1220) and the second cover member (1600) may be required. However, in the dual camera module according to an exemplary embodiment of the present invention, a distance between an upper end of the second housing (1200) and the second cover member (1600) can be shortened compared to the previous comparative example to advantageously fix the Poron without a separate additional member between the second housing (1220) and the second cover member (1600).

Hereinafter, configuration of dual camera module according to a modification of another exemplary embodiment of the present invention will be described with reference to the accompanying drawings.

Figure 6:
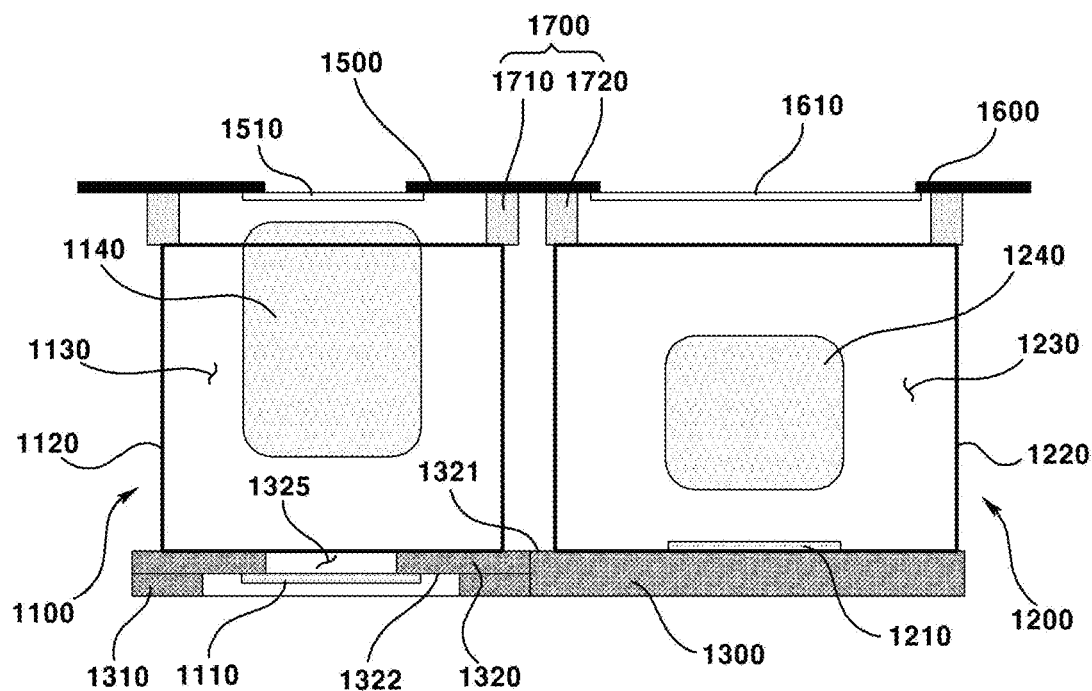
FIG. 6 is a conceptual view illustrating a dual camera module according to a modification of another exemplary embodiment of the present invention.

FIG. 6 is a conceptual view illustrating a dual camera module according to a modification of another exemplary embodiment of the present invention.

Referring to FIG. 6, the dual camera module according to a modification of another exemplary embodiment of the present invention may include a first camera module (1100), a second camera module (1200), a substrate (1300), a first cover member (1500), a second cover member (1600), and a connector (1700). However, in the modification of another exemplary embodiment of the present invention, at least any one of the elements in the first camera module (1100), the second camera module (1200), the substrate (1300), the first cover member (1500), the second cover member (1600), and the connector (1700) may be omitted.

The dual camera module according to the modification of another exemplary embodiment of the present invention may be different from the previously explained other exemplary embodiments of the present invention in terms of mounting method of dual camera module and the first image sensor (1110). Meantime, elements not explained hereinafter in the dual camera module according to the modification of another exemplary embodiment of the present invention may be inferred from the dual camera module according to the other exemplary embodiments of the present invention.

The first image sensor (1110) of the first camera module (1100) in the dual camera module according to the modification of another exemplary embodiment of the present invention may be mounted on the substrate (1300) by way of flip-chip method. For example, the second image sensor (1210) may be mounted at an upper surface (1321) of the second circuit layer (1320) at the substrate (1300), and the first image sensor (1110) may be mounted on a bottom surface (1321) of the second circuit layer (1320) at the substrate (1300). In this case, the first circuit layer (1310) may omit a portion corresponding to a portion where the first image sensor (1110) is mounted at the second circuit layer (1320). Meantime, the second circuit layer (1320) may be formed with a through hole (1325) in order to allow a light having passed the first lens module (1140) to be obtained by the first image sensor (1110) flip-chip bonded to the second circuit layer (1320). That is, the light having transmitted the first lens module (1140) can reach the first image sensor (1110) through the through hole (1325) of the second circuit layer (1320).

In the dual camera module according to the modification of another exemplary embodiment of the present invention may be such that the first image sensor (1110) is disposed at a bottom side of the second image sensor (1210), as in the dual camera module according to the other exemplary embodiments of the present invention. Thus, even in the dual camera module according to the modification of another exemplary embodiment of the present invention, relevant effects such as minimization of inner structure exposure and easy attachment of Poron may be accomplished.

Hereinafter, configuration of optical apparatus according to still another exemplary embodiment will be explained.

The optical apparatus according to a still another exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus according to still another exemplary embodiment of the present invention may include a main body (not shown), a display part (not shown) arranged at one surface of the main body to display information, and a camera having a dual camera module (not shown) disposed at the main body to photograph an image or a photograph.

Hereinafter, configuration of dual camera module according to still another exemplary embodiment of the present invention will be described.

Figure 7:
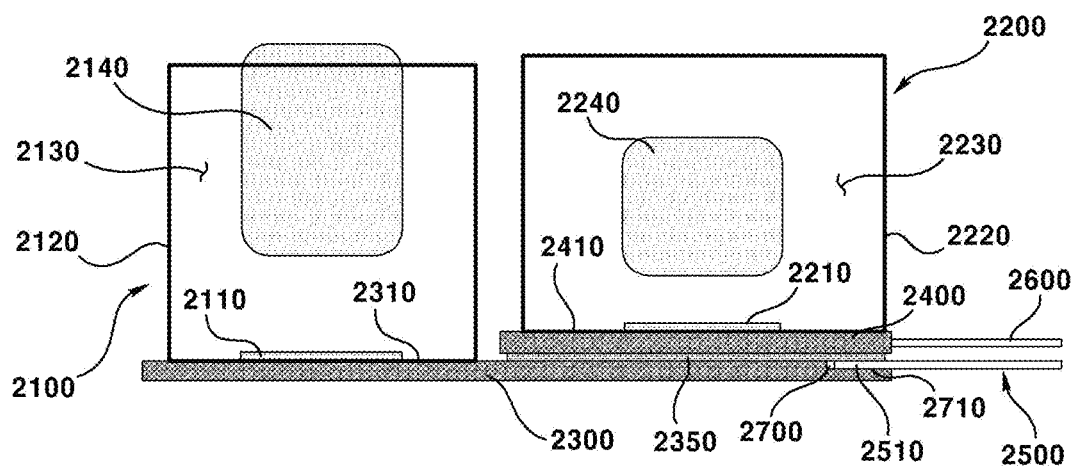
FIGS. 7 and 8 are conceptual views illustrating a dual camera module according to a modification of still another exemplary embodiment of the present invention.
Figure 8:
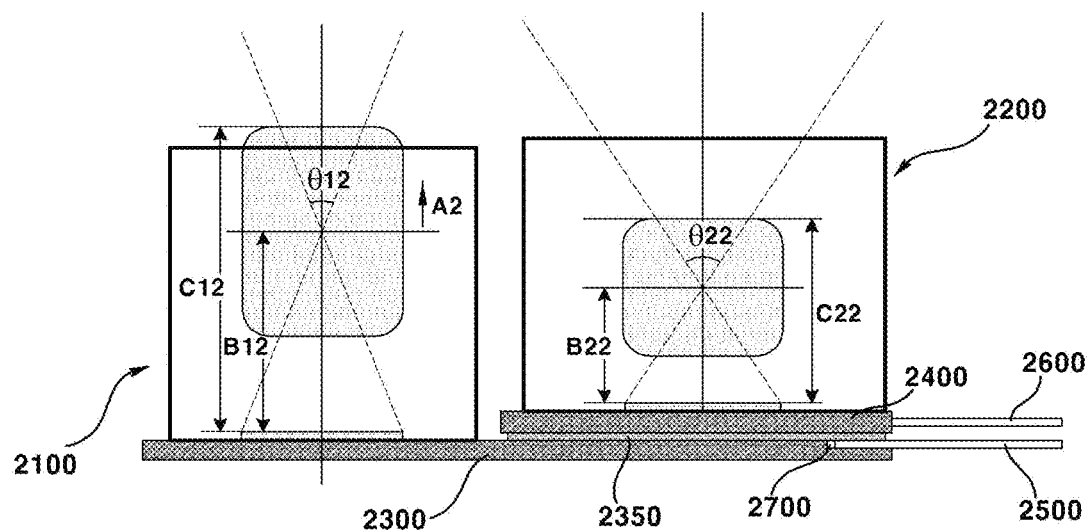

FIGS. 7 and 8 are conceptual views illustrating a dual camera module according to a modification of still another exemplary embodiment of the present invention.

Referring to FIGS. 7 and 8, the dual camera module according to still another exemplary embodiment of the present invention may include a first camera module (2100) and a second camera module (2200). Meantime, the dual camera module according to still another exemplary embodiment of the present invention may further include a first cover member (not shown) to cover the first camera module (2100). Furthermore, the dual camera module according to still an exemplary embodiment of the present invention may further include a second cover member (not shown) to cover the second camera module (2200).

In addition, the dual camera module according to still another exemplary embodiment of the present invention may further include a first substrate (2300) mounted with a first image sensor (2110) of the first camera module (2100). Furthermore, the dual camera module according to still another exemplary embodiment of the present invention may further include a second substrate (2400) mounted with a second image sensor (2210) of the second camera module (2200).

Here, the first cover member and the first substrate (2300) may be formed by using the first camera module (2100), and may be also formed by a member separate from the first camera module (2100). Furthermore, the second cover member and the second substrate (2400) may be formed by using the second camera module (2200), and may be also formed by a member separate from the second camera module (2200). Furthermore, the dual camera module according to still another exemplary embodiment of the present invention may further include a third substrate (2500) electrically connected to the first substrate (2300). Furthermore, a fourth substrate (2600) electrically connected to the second substrate (2400) may be further included. Still furthermore, a cavity (2700) accommodating at least a portion of the third substrate (2500) may be further included by being formed at the first substrate (2300).

The first camera module (2100) may be a narrow angle camera module. In other words, the first camera module (2100) may be narrower in view angle than the second camera module (2200). That is, a view angle ($\theta 12$) of the first camera module (2100) may be narrower than a view angle ($\theta 22$) of the second camera module (2200). An EFL (B12) of the first camera module (2100) may be longer than an EFL (B22) of the second camera module (2200). Furthermore, a TTL (C12) of the first camera module (2100) may be longer than a TTL (C22) of the second camera module (2200).

The first camera module (2100) may include a first image sensor (2110), a first housing (2120), a first inner side space (2130) and a first lens module (2140).

The first image sensor (2110) may obtain a light incident through a first lens module (2140) of the first camera module (2100). The first image sensor (2110) may be mounted on the first substrate (2300). The first image sensor (2110) may be so disposed as to match with the first lens module (2140) at the optical axis, whereby the first image sensor (2110) can output a light as an image by obtaining the light having passed the first lens module (2140). The first image sensor (2110), may be a CCD (Charge Coupled Device), a MOS (Metal Oxide Semiconductor), a CPD or a CID, for example. However, the present invention is not limited to the given types of image sensor and may include other types of image sensors.

A first housing (2120) may be disposed between the first substrate (2300) and the first cover member. The first housing (2120) may form therein a first inner side space (2130) to accommodate the first lens module (2140). The first inner side space (2130) may be interposed between the first substrate (2300) and the first cover member. The first inner side space (2130) may be disposed with the first lens module (2140). The first inner side space (2130) may be so formed as to obtain a moving space of the first lens module (2140) in order to perform the AF function. The moving space of the first lens module (2140) may be formed by a connector (not shown) disposed between the first cover member and the first housing (2120).

The first lens module (2140) may be disposed at the first inner side space (2130). The first lens module (2140) may move to an optical axis direction (vertical direction) in order to perform the AF function. At this time, the movement of the first lens module (2140) may be performed by the electromagnetic interaction.

For example, the movement control of the first lens module (2140) may be implemented through a power application control to a coil by allowing the first lens module (2140) to be disposed with a magnet (not shown), and the first housing (2120) to be disposed with the coil (not shown). Furthermore, the first lens module (2140) may be disposed with the coil and the first housing (2120) may be disposed with a magnet. The optical axis of the first lens module (2140) may match an optical axis of the first image sensor (2110). The optical axis of the first lens module (2140) may be parallel with an optical axis of a second lens module (2240).

The first lens module (2140) may move to a vertical direction which is an optical axis direction in order to perform the AF function. Furthermore, an upper end of the first lens module (2140) may farther protrude over an upper end of the first housing (2120) in response to the movement of the first lens module (2140).

In still another example of the present invention, a connector may be interposed between the cover member and the first housing (2120) in order to secure a moving space of the first lens module (2140). That is, the connector may expand a movable space of the first lens module (2140).

The second camera module (2200) may be a wide angle camera module. In other words, the second camera module (2200) may be wider in view angle than the first camera module (2100). That is, a view angle ($\theta 22$) of the second camera module (2200) may be wider than a view angle ($\theta 12$)

of the first camera module (2100). An EFL (B22) of the second camera module (2200) may be shorter than an EFL (B12) of the first camera module (2100). Furthermore, a TTL (C22) of the second camera module (2200) may be shorter than a TTL (C12) of the first camera module (2100).

The second camera module (2200) may be arranged in parallel with the first camera module (2100). An optical axis of the second camera module (2200) may be aligned with an optical axis of the first camera module (2100). The optical axis of the second camera module (2200) may be in parallel with the optical axis of the first camera module (2100). The second camera module (2200) may be spaced apart from the first camera module (2100). Furthermore, the second camera module (2200) may be so disposed as to abut the first camera module (2100).

The second camera module (2200) may include a second image sensor (2210), a second housing (2220), a second inner side space (2230) and a second lens module (2240).

The second image sensor (2210) may obtain a light incident through a second lens module (2240) of the second camera module (2200). The second image sensor (2210) may be mounted on the second substrate (2400). The second image sensor (2210) may be so disposed as to match with the second lens module (2240) at the optical axis, whereby the second image sensor (2210) can output a light as an image by obtaining the light having passed the second lens module (2240). The second image sensor (2210) may be a CCD (Charge Coupled Device), a MOS (Metal Oxide Semiconductor), a CPD or a CID, for example. However, the present invention is not limited to the given types of image sensors and may include other types of image sensors.

The second housing (2220) may be disposed between the second substrate (2400) and the second cover member. The second housing (2220) may form therein a second inner side space (2230) to accommodate the second lens module (2240). The second inner side space (2230) may be formed inside of the second housing (2220).

The inner side space (2230) may be disposed between the second substrate (2400) and the second cover member. The second inner side space (2230) may be disposed with the second lens module (2240). The second inner side space (2230) may be formed with a moving space of the second lens module (2240) in order to perform the AF function.

The second lens module (2240) may be disposed at the second inner side space (2230). The second lens module (2240) may move to an optical axis direction (vertical direction) in order to perform the AF function. At this time, the movement of the second lens module (2240) may be implemented by electromagnetic interaction. For example, the movement control of the second lens module (2240) may be implemented by power application control relative to the coil while the second lens module (2240) is disposed with a magnet (not shown), and the second housing (2220) is disposed with a coil (not shown). Furthermore, the second lens module (2240) may be disposed with a coil and the second housing (2220) may be disposed with a magnet. The optical axis of the second lens module (2240) may match to that of the second image sensor (2210). The optical axis of the second lens module (2240) may be in parallel with that of the first lens module (2140).

The first substrate (2300) may be mounted with the first image sensor (2110) of the first camera module (2100). That is, the first substrate (2300) may transmit an image to an outside by outputting the image obtained through the first image sensor (2110). An upper surface (2310) of the first substrate (2300) may be mounted with the first image sensor (2110). The upper surface (2310) of the first substrate (2300) may be mounted with a second substrate (2400). Through this configuration, the second image sensor (2210) of the second substrate (2400) may be disposed higher than the first image sensor (2110) mounted on the first substrate (2300). That is, the second image sensor (2210) may be disposed closer to the cover members than the first image sensor (2110).

The first substrate (2300) may supply a power to the first camera module (2100). Meantime, the first substrate (2300) may be disposed with a first controller (not shown) in order to control the first camera module (2100). The first controller may be mounted on the first substrate (2300). The first controller may be disposed at an inside of the first housing (2120).

Meantime, the first controller may control a direction, intensity and amplitude of current supplied to each component forming the first camera module (2100). The first controller may perform at least one of the AF function and a handshake correction function of the camera module by controlling the first camera module (2100). That is, the first controller may move the lens module to an optical axis direction or to a direction perpendicular to the optical axis direction or tilt the lens module by controlling the first camera module (2100). Furthermore, the first controller may perform a feedback control of AF function and handshake correction function relative to the first camera module (2100). Alternatively, the first controller may be disposed outside of the first substrate (2300). In this case, the first controller and the first substrate (2300) may be electrically conducted by the third substrate (2500). The first substrate (2300) may be 0.4 to 0.6 mm in a vertical thickness.

An adhesive (2350) may be interposed between the first substrate (2300) and the second substrate (2400). The adhesive (2350) may fix the second substrate (2400) to the first substrate (2300). The second substrate (2400) may be such that an optical axis alignment with the first substrate (2300) can be adjusted in the course of adhering the first substrate (2300) using the adhesive (2350). That is, an alignment between an optical axis of the first camera module (2100) and an optical axis of the second camera module (2200) may be adjusted by the adhesive (2350). For example, the second substrate (2400) may be movably adhered to the first substrate (2300) using an initially hardened adhesive (2350) where the optical axis may be aligned and the second substrate (2400) may be fixed by using a finally hardened adhesive (2350). The adhesive (2350) may be a non-conductive material, for example. That is, the first substrate (2300) and the second substrate (2400) may not be electrically conductive.

The second substrate (2400) may be mounted with the second image sensor (2210) of the second camera module (2200). That is, the second substrate (2400) may transmit an image obtained through the second image sensor (2210) to an outside. The second substrate (2400) may be mounted at an upper surface (2410) with the second image sensor (2210). The second substrate (2400) may be adhered at a bottom surface to the second image sensor (2310) of the first substrate (2300). Through this configuration, the second image sensor (2410) mounted on the second substrate (2400) may be more closely positioned to the cover member than the first image sensor (2110) mounted on the first substrate (2300).

The second substrate (2400) may supply a power to the second camera module (2200). Meantime, the second substrate (2400) may be disposed with a second controller (not shown) in order to control the second camera module (2200). The second controller may be mounted on the second substrate (2400). Meantime, the second controller may be disposed at an inner side of the second housing (2220).

The second controller may control a direction, intensity and amplitude of a current supplied to each component forming the second camera module (2200). The second controller may perform at least one of the AF function and a handshake correction function of the camera module by controlling the second camera module (2200). That is, the second controller may move the lens module to an optical axis direction or to a direction perpendicular to the optical axis direction or tilt the lens module by controlling the second camera module (2200). Furthermore, the second controller may perform a feedback control of AF function and handshake correction function relative to the second camera module (2200). Alternatively, the second controller and the second substrate (2400) may be electrically conducted. The second substrate (2400) may be 0.4 to 0.6 mm at a vertical thickness.

The third substrate (2500) may be electrically conducted with the first substrate (2300). The third substrate (2500) may electrically connect elements of the optical apparatus with the first substrate (2300). Here, the elements of the optical apparatus may be a controller and a power source. At least one portion of the third substrate (2500) may be accommodated into a cavity (2700) formed at the first substrate (2300). The third substrate (2500) may include a coupling part (2510) accommodated into the cavity (2700).

The first substrate (2300) may have rigidity and the third substrate (2500) may have flexibility. That is, the first substrate (2300) may be a rigid PCB (Printed Circuit Board), and the third substrate (2500) may be a flexible PCB. Meantime, the second substrate (2400) may be a rigid PCB (Printed Circuit Board), and the fourth substrate (2600) may be a flexible PCB. However, the first substrate (2300) may be bonded to the third substrate (2500) by an ACF (Anisotropic Conductive Film), and the second substrate (2400) and the fourth substrate (2600) may be formed with a rigid flexible PCB. Meantime, the reason of bonding the first substrate (2300) and the third substrate (2500) is that the first substrate (2300) requires a hard material such as a ceramic PCB in order to minimize the flatness and bending. That is, the first substrate (2300) may be a ceramic PCB.

The coupling part (2510) may be coupled with the first substrate (2300) using the ACF. Here, the ACF may be a conductive film in a film state by mixing fine conductive particles with adhesive resin. The coupling part (2510) may be bonded to a cavity surface (2710) forming the cavity (2700) in the first substrate (2300). For example, the coupling part (2510) may be interposed between an adhesive (2350) and the first substrate (2300), for example. That is, at least one portion of the third substrate (2500) may be interposed between the adhesive (2350) and the first substrate (2300). However, the coupling part (2510) may be disposed at a bottom surface of the first substrate (2300), in another example. Meantime, the first substrate (2300), the third substrate (2500) and the coupling part (2510) may be overlapped to a vertical direction. That is, the first substrate (2300), the third substrate (2500) and the coupling part (2510) may be vertically overlapped at least at one portion.

The fourth substrate (2600) may be electrically connected to the second substrate (2400). The fourth substrate (2600) may be electrically connected to elements of optical apparatus. Here, the elements of the optical apparatus may be a controller and a power source. The second substrate (2400) may have rigidity and the fourth substrate (2600) may have flexibility. At this time, the second substrate (2400) and the fourth substrate (2600) may be integrally formed to form a rigid flexible PCB. Alternatively, both the second substrate (2400) and the fourth substrate (2600) may be integrally formed with a flexible PCB.

The cavity (2700) may be formed at the first substrate (2300). The cavity (2700) may take a form omitted at one portion of the first substrate (2300). The cavity (2700) may accommodate at least one portion of the third substrate (2500). The cavity (2700) may be disposed at an upper surface of the first substrate (2300), for example. That is, the cavity (2700) may take a shape of a portion at an upper surface of the cavity (2700) being concaved. Alternatively, the cavity (2700) may be disposed at a bottom surface of the first substrate (2300), as another example. That is, the cavity (2700) may take a shape of a portion of the bottom surface at the first substrate (2300) being upwardly concaved. a vertical thickness of the cavity (2700) may be 0.2 to 0.3 mm. That is, the vertical thickness of the cavity (2700) may be half the size of a vertical thickness of the first substrate (2300) and the second substrate (2400). Furthermore, the vertical thickness of the cavity (2700) may correspond to a vertical thickness of the third substrate (2500). A width or an area of the cavity (2700) may be formed to secure a space for ACF bonding of the third substrate (2500) and the first substrate (2300).

A cavity surface (2710) may be used as an upper surface or a bottom surface of the first substrate (2300) forming the cavity (2700). The cavity surface (2710) may be bonded by the coupling part (2510) of the third substrate (2500). To be more specific, the coupling part (2510) of the cavity surface (2710) may be couple by the ACF.

The first cover member may be disposed at an upper side of the first camera module (2100). The first cover member may protect the first camera module (2100) from outside. Meanwhile, the first cover member may form an external look of the dual camera module. The first cover member may be disposed with a first window part (not shown).

The first window part may be disposed on the first cover member. The first window part may have a narrower area than a second window part (not shown). This is for the first window part to obtain a narrower view angle than the second window part. The first window part may be formed with a material capable of transmitting a light. That is, a light having passed the first window part may be obtained by the first image sensor (2110) through the first lens module (2140).

The second cover member may be disposed at an upper side of the second camera module (2200). The second cover member may protect the second camera module (2200) from the outside. Meantime, the second cover member may form an external look of the dual camera module. The second cover member may be formed to have a same height as that of the first cover member. The first cover member and the second cover member may be integrally formed. The first cover member may be disposed with a first window part. The second cover member may be disposed with a second window part.

The second window part may be disposed at the second cover member. The second window part may have a broader area than the first window part. That is, a width of the second window part may be longer than a width of the first window part. The second window part may have a broader area than the first window part. This is for the second window part to obtain a wider view angle than the first window part. The second window part may be formed with a material capable of transmitting a light. That is, a light having passed the second window part may be obtained by the second image sensor (2210) through the second lens module (2240).

Although the foregoing description has explained the present invention by dividing the first cover member and the second cover member, the first cover member and the second cover member may be integrally formed. In this case, the first cover member and the second cover member may be called as cover member. Meantime, although the cover member has been explained as one configuration of the dual camera module, the cover member may be separately configured. For example, the cover member may form an external look of the optical apparatus as one constitutional element.

The dual camera module according to still another exemplary embodiment of the present invention may further comprise a camera module (2100, 2200) and a connector connecting the cover members.

The connector may be interposed between the housing (2120, 2220) of the camera module (2100, 2200) and the cover member. The connector may fix the housing (2120, 2220) to the cover member. Meantime, the connector may fix cover member to the housing (2120, 2220). The connector may be a Poron, for example. In this case, the connector formed with the Poron may not only provide a fixing power to the housing (2120, 2220) and to the cover member but also perform a light shield effect, a cushioning effect and a foreign object prevention effect.

Hereinafter, operation and effect of the dual camera module according to still another exemplary embodiment of the present invention will be described with reference to the accompany drawings.

FIGS. 7 and 8 are conceptual views illustrating a dual camera module according to a modification of still another exemplary embodiment of the present invention.

The first camera module (2100) may be called as a narrow angle camera module (2100) because of having a narrower view angle than the second camera module (2200), and then second camera module (2200) may be called as wide angle camera module (2200) because of having a wider view angle than the first camera module (2100). A lens module (2140) of the narrow angle camera module (2100) may function as a telephoto lens, and a lens module (2240) of wide angle camera module (2200) may function as a wide angle lens.

First of all, the dual camera module can function while an optical axis of the first camera module (2100) and an optical axis of the second camera module (2200) are aligned. The dual camera module according to still another exemplary embodiment of the present invention may output an image obtained by the second camera module (2200) when a user photographs an object of a short distance, and output an image obtained by the first camera module (2100) when a user photographs an object of a long distance. Furthermore, the dual camera module according to still another exemplary embodiment of the present invention may output an image obtained by the first camera module (2100) and an image obtained by the second camera module (2200), based on the distance of an object, by combining the image obtained by the first camera module (2100) and the image obtained by the second camera module (2200).

That is, the dual camera module (2100) according to still another exemplary embodiment of the present invention may obtain objects positioned in a long distance or a close distance as images of clear quality. In other words, the dual camera module (2100) according to still another exemplary embodiment of the present invention can provide a corresponding function as that of a zoom lens even without an zoom lens.

Furthermore, the first image sensor (2110) of the first camera module (2100) may be mounted on the first substrate (2300) and the second image sensor (2210) of the second camera module (2200) is mounted on the second substrate (2400) in the dual camera module according to still another exemplary embodiment of the present invention, where the second substrate (2400) is adhered to an upper surface of the first substrate (2300), and as a result, the first image sensor (2110) can be positioned closer to the cover member than the second image sensor (2210).

In this case, a width of the second window part that must obtain a view angle, which is a wide angle of the second camera module (2200), may become relatively narrower {compared with a case where the second images sensor (2110) is mounted on the first substrate (2300)}. That is, an area of the second window part may be reduced, whereby a phenomenon of an inner configuration of the second camera module (2200) being exposed through the second window part can be inhibited.

Furthermore, in the dual camera module according to still another exemplary embodiment of the present invention, the third substrate (2500) for electric conductibility with an outside may be ACF-bonded to the first substrate (2300) formed with a hard material such as a ceramic PCB in order to minimize the flatness and bending, where the cavity (2700) omitted of a portion of the first substrate (2300) is accommodated by a portion of the third substrate (2500), to which the first substrate (2300) and the portion of the third substrate (2500) are ACF-bonded to thereby minimize a total length of the dual camera module.

Particularly, the first substrate (2300) is not formed with the cavity (2700), but the first substrate (2300) is extended to the outside, at which, when compared with a case of the third substrate (2500) being ACF-bonded at the extended portion, the reduced total length of the dual camera module according to still another exemplary embodiment of the present invention can be clearly recognized.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera device, comprising:
a first camera module facing a first direction; and
a second camera module facing a second direction that is in parallel to the first direction,
wherein the first camera module comprises:
a first substrate comprising a first circuit layer and a second circuit layer disposed on an upper surface of the first circuit layer and comprising a hole,
a first image sensor disposed on the upper surface of the first circuit layer and disposed in the hole of the second circuit layer, and
a first lens disposed above the first image sensor;
wherein the second camera module comprises:
a second substrate,
a second image sensor disposed on an upper surface of the second substrate, and
a second lens disposed above the second image sensor;
wherein an upper surface of the second circuit layer of the first substrate and the upper surface of the second substrate are disposed on one plane, and
wherein a lower end of the first lens is disposed at a position lower than the position of an upper end of the second lens and higher than a position of a lower end of the second lens.

2. The camera device of claim 1, wherein the second camera module has an angle of view wider than that of the first camera module.

3. The camera device of claim 1, wherein the first camera module comprises a first window disposed above the first lens,
wherein the second camera module comprises a second window disposed above the second lens, and
wherein, in a horizontal direction, an area of the second window is greater than an area of the first window.

4. The camera device of claim 1, wherein a lower surface of the second image sensor is disposed at a position higher than a position of an upper surface of the first image sensor.

5. The camera device of claim 1, wherein the first camera module comprises a first housing accommodating at least a part of the first lens, and the second camera module comprises a second housing accommodating at least a part of the second lens, and
wherein an upper end of the first housing is disposed at a vertical position corresponding to a vertical position of an upper end of the second housing.

6. The camera device of claim 5, wherein the first camera module comprises a magnet and a coil moving the first lens through an electromagnetic interaction with the magnet, and
wherein an upper end of the first lens upwardly protrudes further than the upper end of the first housing in response to a movement of the first lens.

7. The camera device of claim 5, wherein the first housing is spaced apart from the second housing.

8. The camera device of claim 1, wherein an EFL (Effective Focal Length) or TTL (Total Track Length) of the second camera module is shorter than that of the first camera module.

9. The camera device of claim 1, wherein a lower surface of the second circuit layer of the first substrate and a lower surface of the second substrate are disposed on one plane, and
wherein, in a vertical direction, a thickness of the second substrate is in a range of 0.4 mm~0.6 mm.

10. The camera device of claim 1, wherein the first substrate and the second substrate are integrally formed.

11. The camera device of claim 1, wherein a distance between an upper end of the first lens and the lower end of the first lens is greater than a distance between the upper end of the second lens and the lower end of the second lens.

12. The camera device of claim 3, wherein a horizontal width of the second window is greater than a horizontal width of the second image sensor.

13. The camera device of claim 1, wherein an upper end of the first lens is disposed at a position higher than a position of the upper end of the second lens, and
wherein the first image sensor is not overlapped with the second image sensor in a horizontal direction.

14. The camera device of claim 1, wherein a center of the first lens is disposed at a position higher than that of a center of the second lens in an initial state in which no current is supplied.

15. An optical apparatus, the optical apparatus comprising:
a cover member;
a display part disposed on the cover member; and
a camera device of claim 1 disposed in the cover member.

16. The optical apparatus of claim 15, wherein a distance between the cover member and the first image sensor is greater than a distance between the cover member and the second image sensor.

17. A camera device, comprising:
a first camera module facing a first direction; and
a second camera module facing a second direction that is in parallel to the first direction,
wherein the first camera module comprises:
a first substrate comprising a first circuit layer and a second circuit layer disposed on an upper surface of the first circuit layer,
a first image sensor disposed on the upper surface of the first circuit layer, and
a first lens disposed above the first image sensor;
wherein the second camera module comprises:
a second substrate,
a second image sensor disposed on an upper surface of the second substrate, and
a second lens disposed above the second image sensor;
wherein a lower surface of the second image sensor is disposed at a position higher than a position of an upper surface of the first image sensor, and wherein a lower end of the first lens is disposed at a position lower than the position of an upper end of the second lens and higher than a position of a lower end of the second lens.

18. The camera device of claim 17, wherein the second camera module has an angle of view wider than that of the first camera module.

19. The camera device of claim 17, wherein the first camera module comprises a first window disposed above the first lens, wherein the second camera module comprises a second window disposed above the second lens, and wherein, in a horizontal direction, an area of the second window is greater than an area of the first window.

20. The camera device of claim 17, wherein an upper end of the first lens is disposed at a position higher than a position of the upper end of the second lens, and wherein the first image sensor is not overlapped with the second image sensor in a horizontal direction.

\* \* \* \* \*